(12) United States Patent
Naidu et al.

(10) Patent No.: US 9,667,916 B2
(45) Date of Patent: *May 30, 2017

(54) AUDIO AND VIDEO CALLING THROUGH MULTIPLE TERMINAL DEVICES

(71) Applicant: AT&T INTELLECTUAL PROPERTY I, LP, Atlanta, GA (US)

(72) Inventors: Lakshminarashimhan Naidu, Pearland, TX (US); Thomas P. Benzaia, Sugar Land, TX (US); Bernard Ku, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/817,527

(22) Filed: Aug. 4, 2015

(65) Prior Publication Data

US 2015/0341595 A1    Nov. 26, 2015

Related U.S. Application Data

(63) Continuation of application No. 13/943,864, filed on Jul. 17, 2013, now Pat. No. 9,131,108, which is a continuation of application No. 12/898,214, filed on Oct. 5, 2010, now Pat. No. 8,558,863.

(51) Int. Cl.
*H04N 7/14* (2006.01)
*H04N 7/15* (2006.01)

(52) U.S. Cl.
CPC ............. *H04N 7/15* (2013.01); *H04N 7/147* (2013.01); *H04N 7/148* (2013.01)

(58) Field of Classification Search
USPC ...... 348/14.01–14.09; 455/416; 709/204–206
See application file for complete search history.

(56) References Cited

U.S. PATENT DOCUMENTS

| | | | |
|---|---|---|---|
| 7,024,461 B1* | 4/2006 | Janning | H04L 29/06027 709/207 |
| 7,929,544 B2* | 4/2011 | Kimmitt | H04M 3/42059 370/395.3 |
| 8,355,503 B2* | 1/2013 | Orr | G06F 7/588 380/270 |
| 2007/0291736 A1* | 12/2007 | Furlong | H04L 12/2803 370/352 |

(Continued)

*Primary Examiner* — Maria El-Zoobi
(74) *Attorney, Agent, or Firm* — Guntin & Gust, PLC; Jay H. Anderson

(57) ABSTRACT

A system that incorporates teachings of the present disclosure may include, for example, a computer-readable storage medium in a media controller having computer instructions to execute a soft-phone client application on the media processor, receive a call originating from an internet protocol multimedia subsystem network where the calls are directed to the media processor by a gateway having a switch that routes the call in accordance with a destination address included in a session initiation protocol header message, and selectively answer the call at any of a plurality of terminal devices including a mobile cellular phone coupled to the media processor via a femtocell. The computer instructions can be operable to present an audio portion of the call through a speaker of a presentation device operatively coupled to the media processor. Other embodiments are disclosed.

20 Claims, 6 Drawing Sheets

(56) References Cited

U.S. PATENT DOCUMENTS

| | | | |
|---|---|---|---|
| 2008/0069087 A1* | 3/2008 | Igoe | H04L 12/2809 370/352 |
| 2008/0141302 A1* | 6/2008 | Ota | G08C 17/00 725/34 |
| 2008/0165283 A1* | 7/2008 | Brandt | H04M 3/42195 348/552 |
| 2008/0309753 A1 | 12/2008 | Karnalkar | |
| 2010/0180313 A1* | 7/2010 | Bi | H04N 5/76 725/110 |
| 2011/0191826 A1* | 8/2011 | Ballal | H04L 63/104 726/4 |
| 2011/0202956 A1* | 8/2011 | Connelly | H04N 21/433 725/38 |

* cited by examiner

AUDIO AND VIDEO CALLING THROUGH MULTIPLE TERMINAL DEVICES

CROSS-REFERENCE TO RELATED APPLICATIONS

This application is a continuation of U.S. application Ser. No. 13/943,864, filed Jul. 17, 2013, which is a continuation of U.S. application Ser. No. 12/898,214, filed Oct. 5, 2010, which are incorporated herein by reference in their entirety.

FIELD OF THE DISCLOSURE

The present disclosure relates generally to audio and video calling and more specifically to an audio and video calling though multiple terminal devices.

BACKGROUND

Existing IPTV systems have Voice over IP or VoIP and video conferencing capabilities using computer equipment and specialized VoIP telephones. These functions are not integrated elegantly with a number of other functions associated with IPTV network services such as video presentations. Subscribers receiving calls during the presentation of a media program may be inconvenienced and miss part of the presentation in their attempts to answer a call or even to make a call using the IPTV calling features. Generally, existing subscribers are making and answer phone calls using existing corded or cordless phones that may be coupled via an RJ11 jack to a Terminal Adapter located inside a Residential Gateway.

Femtocells allow a broadband network subscriber to essentially create their own cellular coverage area which can relieve wireless traffic demands on surrounding cellular coverage areas or cellular base stations. Provisioning a femtocell on to a broadband network is generally deployed to improve indoor wireless coverage provided by a wireless network operator. Cellular phone calls received and routed via a femtocell can also cause an IPTV network subscriber to be inconvenienced by missing part of a video presentation at an STB when answering the cellular call.

DETAILED DESCRIPTION

Figure 1:
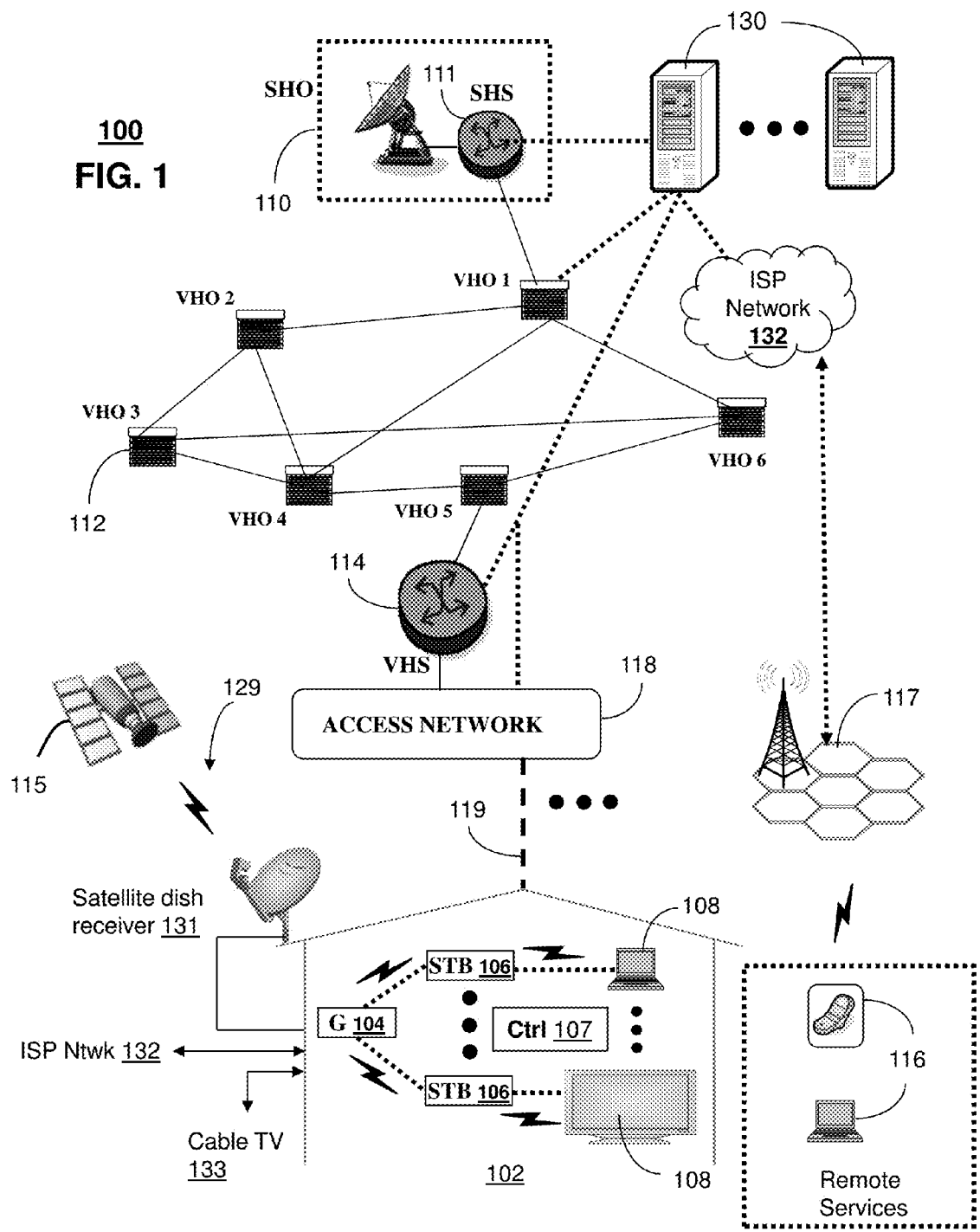
FIGS. 1-2 depict illustrative embodiments of communication systems that provide media services.

The present disclosure describes, among other things, illustrative embodiments of IPTV audio and video calling. Other embodiments are contemplated by the present disclosure.

One embodiment of the present disclosure includes a set-top box (STB) for use in an Internet Protocol Television (IPTV) network comprising a controller to execute a soft-phone client application on the STB where the soft phone application is operable to establish communications with a Residential Gateway (RG) having a switching element capable of selectively routing audio or video calls to a plurality of terminal devices including the STB and a mobile cellular phone communicatively coupled to the RG via a femtocell, receive incoming or initiate outgoing audio or video calls associated with a mobile cellular service responsive to the RG detecting that the mobile cellular phone has established communications with the femtocell and in accordance with routing instructions at the RG, and present a web portal to set routing preferences for the RG for routing the incoming or outgoing audio or video calls associated with the mobile cellular phone.

One embodiment of the present disclosure includes a non-transitory computer-readable storage medium in a media controller having computer instructions to execute a soft-phone client application on the media processor, and receive an audio call or a video call originating from an IP Multimedia Subsystem (IMS) network where the calls are directed to the media processor by a gateway having a switching element that routes the audio call or video call. In the one embodiment, the switching element can route the calls in accordance with a destination address included in a Session Initiation Protocol (SIP) header message. The computer instructions can be operable to selectively answer one of the audio call or the video call at any of a plurality of terminal devices including at the media processor when the media processor is selectively chosen and at a mobile cellular phone coupled to the media processor via a femtocell when the cellular phone is selectively chosen. The computer instructions can be operable to present an audio portion of the audio call or of the video call through a speaker of a presentation device operatively coupled to the media processor.

One embodiment of the present disclosure includes a method at a gateway for receiving a Session Initiation Protocol (SIP) message corresponding to an audio call or a video call, determining from a called number in the SIP message that the audio call or the video call is directed to a Set-Top Box (STB) coupled to the gateway, and receiving at least one of audio calls and video calls destined for the STB. The method at the gateway can also retrieve from the SIP message a calling party number, transmit to the STB a caller identification (ID) associated with the calling party number, cause a digital switch in the gateway to route the audio call or the video call to the STB on the basis of the called number in SIP message and responsive to receiving a signal from the STB indicating that the audio call or video call has been answered by the STB, and alternatively route the audio call or the video call to any of a plurality of terminal devices coupled to the gateway including a mobile cellular phone coupled to the gateway via a femtocell when the cellular phone is selectively chosen.

FIG. 1 depicts an illustrative embodiment of a first communication system 100 for delivering media content. The communication system 100 can represent an Internet Protocol Television (IPTV) media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, and combinations thereof. The SHS server 111 can forward packets associated with the media content to one or more video head-end servers (VHS) 114 via a network of video head-end offices (VHO) 112 according to a common multicast communication protocol.

The VHS 114 can distribute multimedia broadcast content via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered communication technologies (such as coaxial, powerline or phone line wiring) or can operate over a wireless access protocol such as Wireless Fidelity (WiFi). By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 129 can be used also in the media system of FIG. 1. The satellite broadcast television system can be overlaid, operably coupled with, or replace the IPTV system as another representative embodiment of communication system 100. In this embodiment, signals transmitted by a satellite 115 carrying media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to the ISP network 132 to enable interactive services such as VoD and EPG as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can provide Internet, telephony, and interactive media services also.

It is contemplated that the present disclosure can apply to any present or next generation over-the-air and/or landline media content services system.

Some of the network elements of the IPTV media system can be coupled to one or more computing devices 130, a portion of which can operate as a web server for providing portal services over an Internet Service Provider (ISP) network 132 to wireline media devices 108 or wireless communication devices 116.

All forms of media services can be offered to media devices over landline technologies such as those described above. Additionally, media services can be offered to media devices by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

Illustrative embodiments of methods that can operate in portions of the devices of FIG. 1 are described below.

Figure 2:
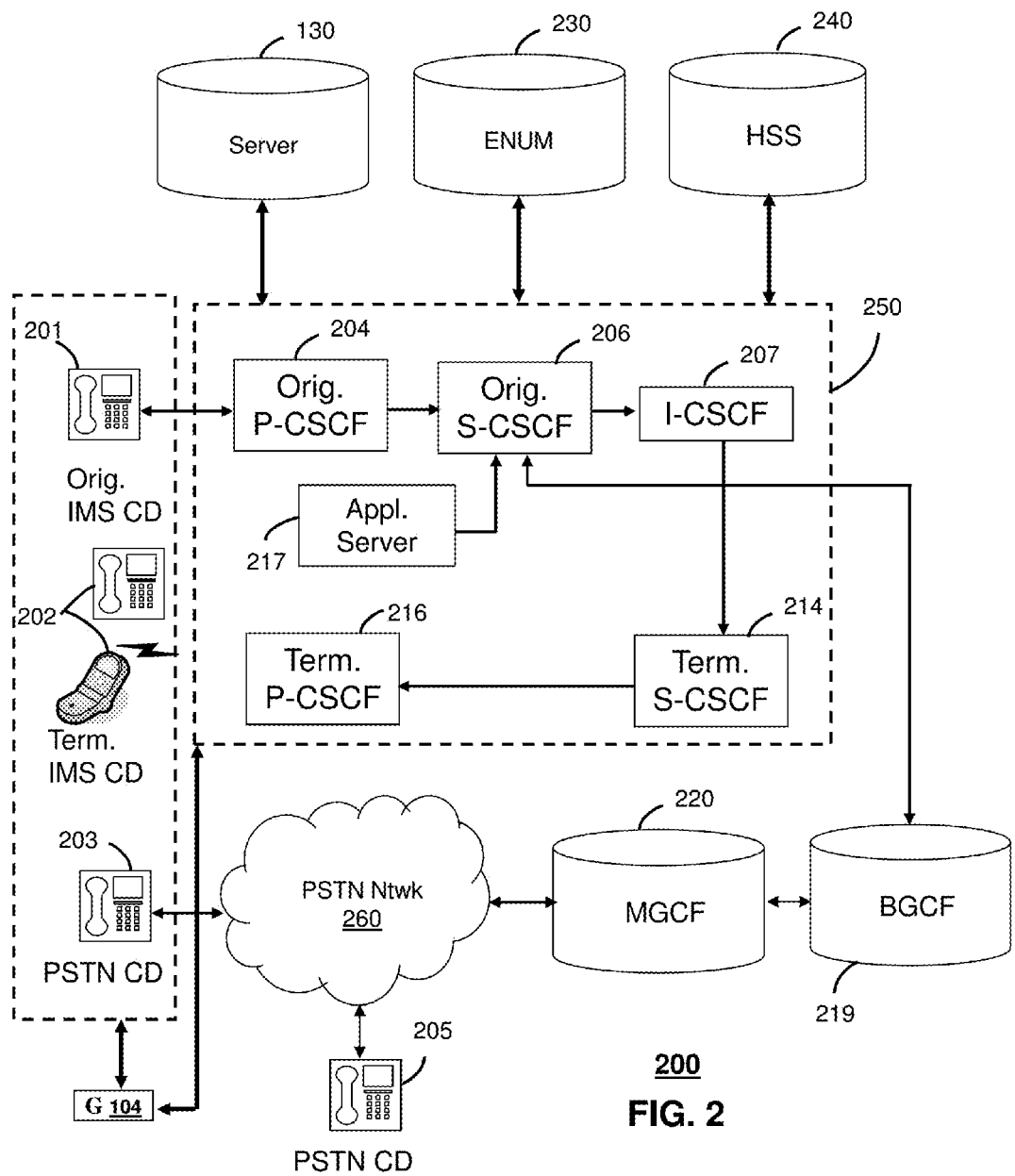

FIG. 2 depicts an illustrative embodiment of a communication system 200 employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260. The MGCF 220 is not used when a communication session involves IMS CD to IMS CD communications. Any communication session involving at least one PSTN CD requires the use of the MGCF 220.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit the SIP INVITE message to an application server (AS) such as reference 217 that can provide a variety of services to IMS subscribers. For example, the application server 217 can be used to perform originating treatment functions on the calling party number received by the originating S-CSCF 206 in the SIP INVITE message. Originating treatment functions can include determining whether the calling party number has international calling services, and/or is requesting special telephony features (e.g., *72 forward calls, *73 cancel call forwarding, *67 for caller ID blocking, and so on).

Additionally, the originating S-CSCF 206 can submit queries to the ENUM system 230 to translate an E.164 telephone number in the SIP INVITE to a SIP Uniform Resource Identifier (URI) if the terminating communication device is IMS compliant. The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD over the PSTN network 260.

The aforementioned communication process is symmetrical. Accordingly, the terms "originating" and "terminating" in FIG. 2 are interchangeable. It is further noted that communication system 200 can be adapted to support video conferencing. In addition, communication system 200 can be adapted to provide the IMS CDs 201 and 202 with the multimedia and Internet services of communication system 100.

Illustrative embodiments of methods that can operate in portions of the devices of FIG. 2 are described below.

Figure 3:
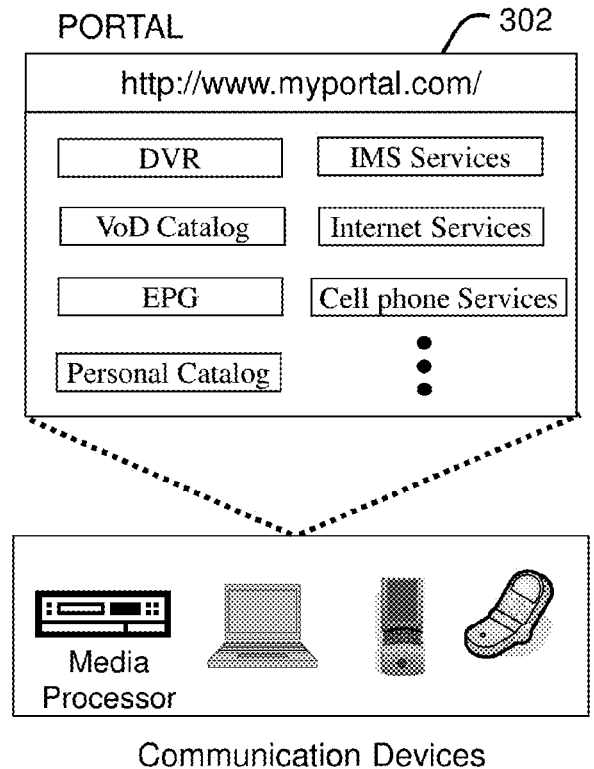
FIG. 3 depicts an illustrative embodiment of a portal interacting with the communication systems of FIGS. 1-2.

FIG. 3 depicts an illustrative embodiment of a portal 302 which can operate from the computing devices 130 of the communication system 100 illustrated in FIG. 1. The portal 302 can be used for managing services of communication systems 100-200. The portal 302 can be accessed by a Uniform Resource Locator (URL) with a common Internet browser such as Microsoft's Internet Explorer™ using an Internet-capable communication device such as those described for FIGS. 1-2. The portal 302 can be configured, for example, to access a media processor 106 and services managed thereby such as a Digital Video Recorder (DVR), a VoD catalog, an EPG, or a personal catalog (such as personal videos, pictures, audio recordings, etc.) stored in the media processor 106. The portal 302 can also be used for provisioning IMS services described earlier, provisioning Internet services, provisioning cellular phone services, and so on.

Illustrative embodiments of methods that can operate in portions of the portal 302 of FIG. 3 are described below.

Figure 4:
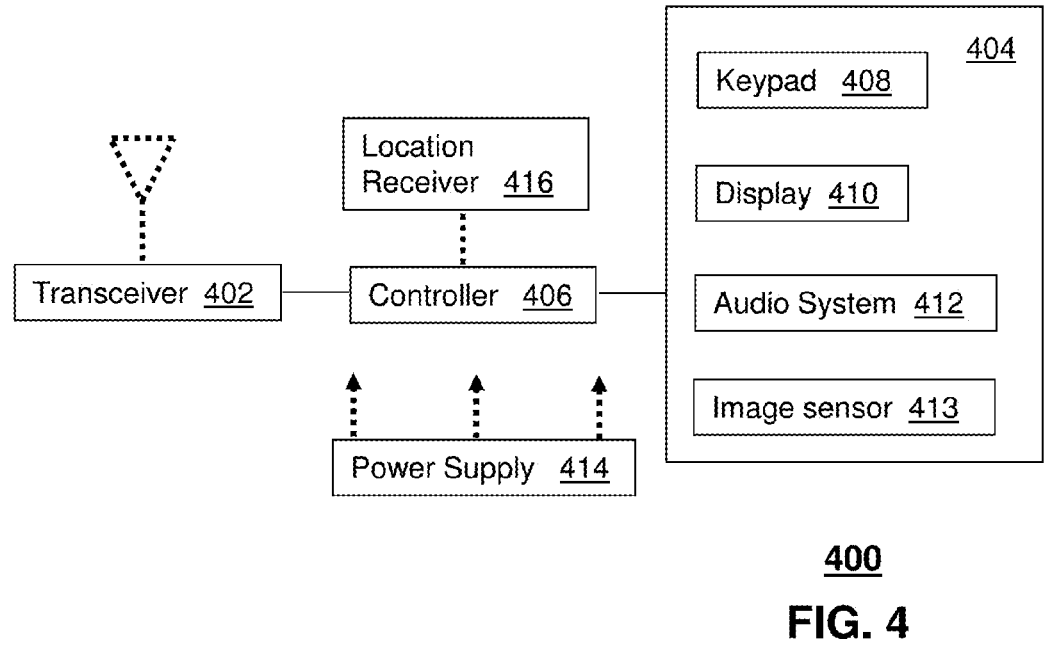
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the communication devices of FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver for identifying a location of the communication device 400 based on signals generated by a constellation of GPS satellites, thereby facilitating common location services such as navigation.

The communication device 400 can use the transceiver 402 to also determine a proximity to a cellular, WiFi or Bluetooth access point by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Illustrative embodiments of methods that can operate in portions of the communication device of FIG. 4 are described below.

Figure 5:
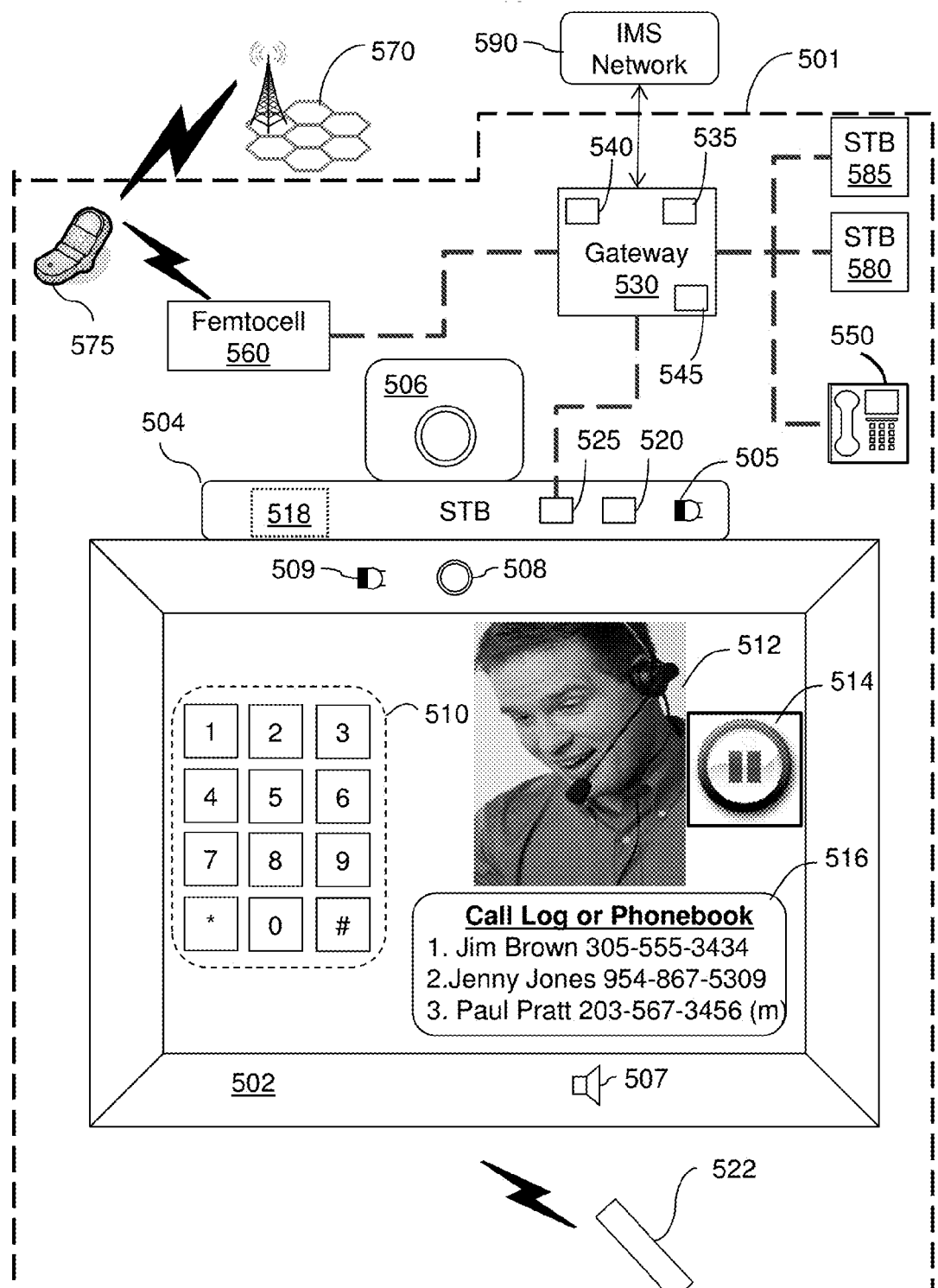
FIG. 5 depicts an illustrative embodiment of a system.

FIG. 5 depicts a system 500 within a premise 501 for use in an IPTV network 100 (such as shown in FIG. 1) in accordance with the claimed embodiments. The system 500 can include an STB 504 having a controller 520 operable to, among other things, execute a soft-phone client application on the STB 504, receive audio calls or video calls at the STB 504 using the soft-phone client application, detect and present a Caller ID associated with an audio call or a video call, and to selectively answer the audio call or the video call. The controller 520 can also be operable to receive the audio call or video call routed from a gateway (such as a Residential Gateway (RG)) 530 communicatively coupled to the IPTV network 100 when the audio call or video call is selectively answered and present the audio call or video call through a presentation device 502 coupled to the STB 504. The gateway 530 can include a switching element capable of directing calls to a select communication device in a premise according to a destination address in, for example, a SIP message received by the gateway 530. The switching element 545 can be implemented in software, hardware, or a combination thereof.

A video call can be presented for example in a viewing area 512 of the presentation device 502. The STB 504 can further include a terminal adaptor 525 that is integrated within the STB 504. The terminal adapter 525 can serve the function of converting VoIP signals to Plain Old Telephone Service (POTS) signals commonly used by non-VoIP-capable phones. A gateway 530 which can operate in a residence or commercial establishment can couple to the STB's internal terminal adaptor 525 via the STB 504 since the gateway 530 communicates with the STB 504 and the STB communicate with its internal terminal adaptor 525. The gateway can also include its own processor or controller 540 and its own terminal adaptor 535 for coupling to analog telephone sets. The gateway 530 can also connect to a VoIP phone 550, one or more secondary STBs 504, 580 or 585 or a Femtocell 560 for enabling communications via a mobile cellular phone 575 as shown.

The femtocell 560 can be used to enable a mobile cellular phone 575 to receive and initiate calls when cellular coverage is poor in the vicinity of premise 501. The mobile phone 575 can also communicate via a wireless base station 570 outside of the premise 501 when cellular coverage is available. Note that the gateway 530 can couple to any number of terminal devices such as additional STBs, computers, and traditional POTs phone devices. STBs 504, 580 and 585 as well as VoIP phone 550 and femtocell 560 are shown as examples of such terminal devices. The gateway 530 can also be coupled to an IPTV or IMS network outside the premise as well. Depending on whether the terminal device is VoIP-capable, a terminal device may or may not be necessary.

The presentation device 502 can be a television having a speaker 507 that enables an audio call or an audio portion of a video call to be presented through the speaker 507 of the television 502. The STB 504 can include a microphone 505 or a microphone 509 operatively coupled to the STB 504 for transmitting audio input from the STB 504 to a calling party telephony device or called party receiving telephony device. The microphone 505 can be integrated within the STB 504 and the microphone 509 can be integrated within the television 502. The system 500 can also include an IP camera 506 operatively coupled to the STB 504 for transmitting video signals or video input from the STB 504 to a calling party telephony device or called party telephony device. Alternatively or optionally, a camera 508 can be integrated as part of the television 502 and operatively coupled to the STB 504.

The STB 504 can also include a digital video recorder (DVR) 518 or have DVR functionality. The controller 520 can perform one or more of the functions among pause, record and mute of a media presentation or media program 514 for a duration of an answered call or the duration of an STB initiated call. The controller 520 can also facilitate a voice call using the STB 504 by presenting a virtual phone keypad 510 on a display of the presentation device 502 and enable selections of keys using a remote control 522 of the STB 504. The controller 520 can be directed to initiate a voice call or a video call based on a selection made from of a call log screen or an electronic phonebook 516. The controller 520 can also initiate a video call by using SIP Options messages for service discovery to determine if an endpoint calling device is available to receive the video call.

Figure 6:
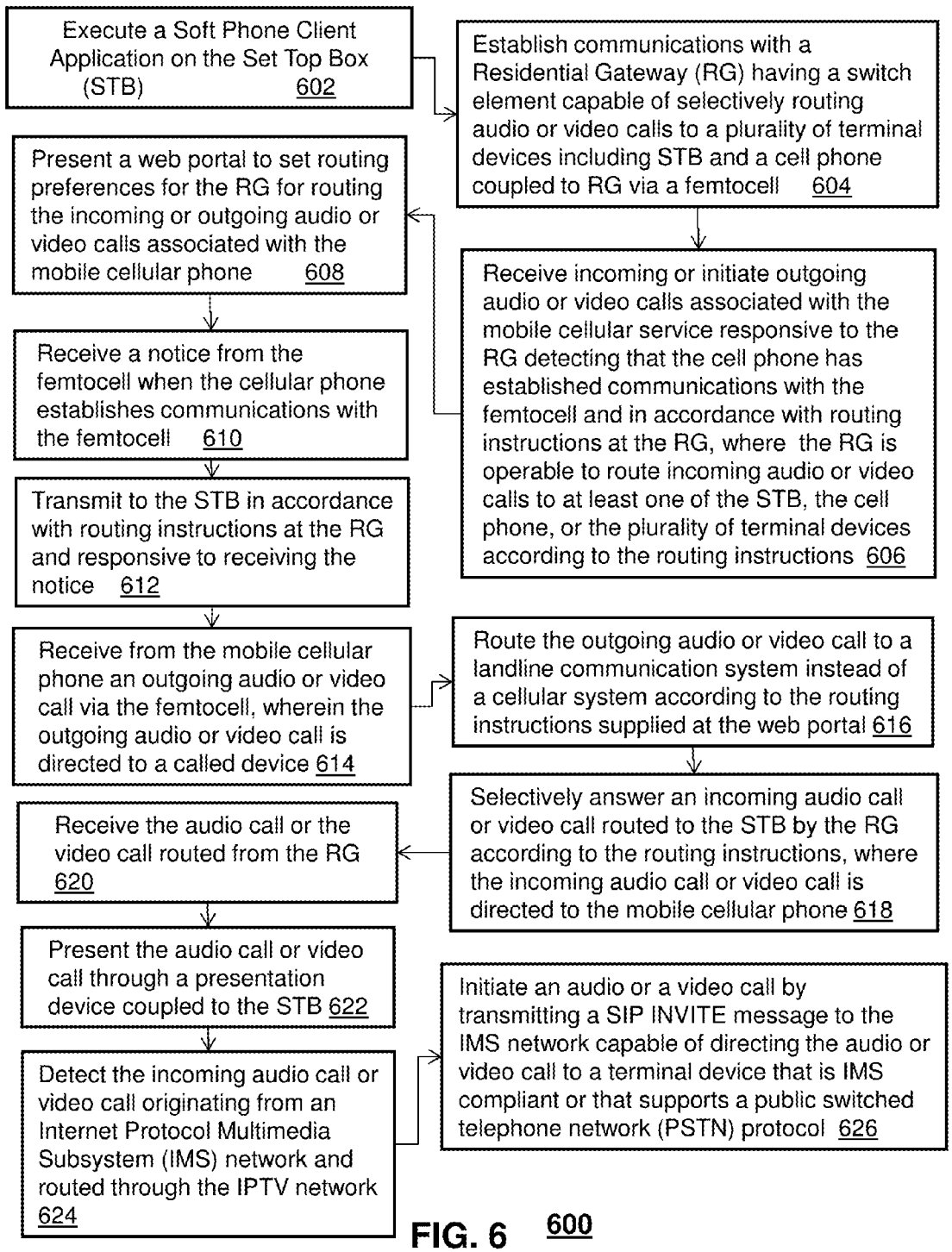
FIG. 6 depicts an illustrative embodiment of a method operating in portions of the systems described in FIGS. 1-5.

The present disclosure contemplates a STB 504 and a gateway (530 or 104 of FIG. 1) that among other things facilitates audio and video calls via an IPTV network using soft phone client software in the STB 504 capable of optionally pausing, recording or muting an ongoing media presentation or program according to the illustrative embodiments of method 600 of FIG. 6. By combining DVR functions with the audio and video call functions, a subscriber can conveniently and unobtrusively manage phone and video calls by pausing or muting or allowing background recording of a presentation for the duration of a call.

In one embodiment, the incoming calls can be processed programmatically. For example, the controller in the STB or DVR is operable to cause the DVR to automatically pause, record or mute a media presentation responsive to answering the audio or video call based on an incoming caller identifier and the assigned affiliation of the incoming caller identifier to a preset group. For instance, if a caller identifier is on a "preferred mute" list the DVR causes muting, or if the caller identifier belongs to a "preferred pause" list the DVR generates a pause, and if a caller identifier belongs to a "preferred record" list, then the DVR records the media presentation.

The soft-phone client along with the femtocell 560 increases the number of available telephone numbers that may be used at the STB 504 (or at other terminal devices 580, 585, 550 and 575 coupled to the gateway 530) by integrating wireless carrier services used by the mobile cellular phone 575 and multiple VoIP numbers. The embodiments herein allow users to place or receive (originate or terminate) voice and/or video telephone calls on the STB 504 using any of the wireless subscriber numbers or broadband VoIP subscriber numbers. Thus, multiple VoIP and wireless phones numbers can be registered with the gateway 530 to allow incoming and outgoing calls through the various terminal devices coupled to the gateway 530. In one example, when a call is received via a subscriber's wireless phone line and the wireless phone is within range of their femtocell, if the subscriber has configured calls to route to the STB, then the Caller ID data can be displayed on the subscriber's television set 502. The user can answer the call via their soft-phone client application in the STB 504.

When a call is received from any one of the multiple VoIP telephone numbers or station identifiers (504, 550, 580, 585, 575), the subscriber user can answer the call from the STB 504 if so desired. The subscriber can also select a telephone number to use for outgoing calls from a list of telephone numbers that are registered with the gateway 530. Thus, a call from the STB 504 can make an outgoing call using a phone number that is associated with terminal devices 504, 575, 550, 580 or 585 for example even though the outgoing call is made from STB 504.

FIG. 6 depicts an illustrative method 600 that operates in portions of the devices of FIGS. 1-5. Method 600 can begin at 602 in which a soft phone client application (hereinafter "softphone") is executed in the STB 504. At 604 the STB 504 by way of softphone can establish communications with a gateway having a switching element capable of selectively routing audio or video calls to a plurality of terminal devices including the STB 504 and a mobile cellular phone communicatively coupled to the gateway via a femtocell 560. At 606, the method can receive incoming or initiate outgoing audio or video calls associated with the mobile cellular service responsive to the gateway or RG detecting that the mobile cellular phone has established communications with the femtocell and in accordance with routing instructions at the gateway or RG. The softphone can then present a web portal enabling the setting of routing preferences for the gateway or RG at 608 for routing the incoming or outgoing audio or video calls associated with the mobile cellular phone. At 610, the gateway or RG can be operable to receive a notice from the femtocell when the mobile cellular phone establishes communications with the femtocell and at 612 the gateway or RG can transmit to the STB in accordance with routing instructions at the gateway and responsive to receiving the notice. Note that the RG is operable to route incoming audio or video calls associated with the mobile cellular phone to at least one of the STB, the mobile phone, and the plurality of terminal devices according to the routing instructions at the gateway.

At 614, the gateway can be operable to receive from the mobile cellular phone an outgoing audio or video call via the femtocell, wherein the outgoing audio or video call is directed to a called device. At 616, the gateway can route the outgoing audio or video call to a landline communication system instead of a cellular system according to the routing preferences supplied at the web portal. The landline communication system can correspond to one of an Internet Protocol Multimedia Subsystem (IMS) network, a Voice over Internet Protocol (VoIP) network, or a Public Switched Telephone Network (PSTN) for example. In one embodiment, the landline communication system can present at the called device a caller identification (ID) different from a caller ID of the mobile cellular phone. The STB can instruct the gateway or RG to use a Caller ID associated with any number of terminal devices registered with the gateway or RG when making outgoing calls from any of the terminal devices, not just the mobile cellular phone. The plurality of terminal devices registered with the RG can comprise for example, the STB, a secondary STB, and a Voice-over-Internet Protocol (VoIP) phone, and where the switching element of the RG is capable of directing calls to each of the terminal devices in response to the routing preferences entered at web portal at communicated to the gateway or RG. In one embodiment, the web portal can provide the RG with routing preferences to direct calls to each of the terminal devices according to a destination address in a Session Initiation Protocol (SIP) header message.

The softphone can be operable at 618 to selectively answer an incoming audio call or video call routed to the STB 504 by the gateway 530 according to the routing instructions where the incoming audio call or video call is directed to the mobile cellular phone. At 620, the audio call or the video call routed from the RG is received and at 622 the audio call or video call is presented through a presentation device coupled to the STB. Of course, the call can be presented at any number of terminal devices registered with the RG. In one embodiment, the STB comprises an integrated terminal adaptor for converting VoIP signals to Plain Old Telephone Service (POTS) signals, and wherein the controller is operable to cause the soft-phone to process digital samples of the POTS signals. The STB can also comprise a digital video recorder (DVR) where the controller is operable to cause the DVR to pause, record or mute a media presentation responsive to answering the audio or video call, or when a call is initiated by the STB. The presentation device can be a television having an integrated microphone and an integrated camera that also transmits audio and video signals to a calling party device or called party device.

At 624, the softphone can detect the incoming audio call or video call originating from an Internet Protocol Multimedia Subsystem (IMS) network and routed through the IPTV network. At 626, the controller can be operable to initiate an audio or a video call by transmitting a SIP INVITE message to the IMS network capable of directing the audio or video call to a terminal device that is IMS compliant or that supports a public switched telephone network (PSTN) protocol.

Upon reviewing the aforementioned embodiments, it would be evident to an artisan with ordinary skill in the art that said embodiments can be modified, reduced, or enhanced without departing from the scope and spirit of the claims described below. For example, when a caller ID message is displayed on the TV, the user can have option to answer the call or discard the alert message from the TV screen (where a default option can exit the caller ID message in 2 seconds or other predetermined time if the user does not press anything). If the user selects the option to answer the call, then the Residential Gateway (RG) will route the call to the STB (with the STB running the soft phone client) and the STB will answer the call (with an SIP 200 OK message sent from the STB via the RG) and the phone will stop ringing (SIP 180/183 ringing).

Also note that the embodiments can make voice calls in several ways. In one instance, a pop-up phone keypad can be presented on the screen allowing the user to dial out. In another embodiment, the user can have access to various call logs or phonebooks on-screen and click on the name or phone number of the party to call. In any case, the call will be made via the STB (voice via TV speakers and STB microphone) routed through the RG which would have VOIP service for example.

In yet other embodiments, the switching element in the RG can selectively route one of outgoing calls originated from the STB through the mobile cellular service using a caller identifier of the mobile cellular phone, or outgoing calls originated from the VoIP phone through the mobile cellular service using a caller identifier of the mobile cellular service, or outgoing calls originated from the mobile cellular phone using a VoIP service using a caller identifier of the VoIP service. Even though mobile cellular phone can be connected to the RG via the femtocell, the cellular phone service does not necessarily get pooled with other terminal devices having subscriber services. For example, the mobile cellular phone pools its subscriber services with the plurality of terminal devices only when the subscription for cellular service and the subscription for IMS network or IPTV services share a common subscriber and/or when the gateway is configured to allow pooling of services.

In making a video call from one similarly set up system to another, SIP Options messages for service discovery can be used to see if another end point is also available and compatible for a video call. This can be done using ENUM located in the IMS core. If service discovery returns OK, then the user is allowed to make the video call via the STB and the called party will get a caller ID message on his/her STB. The called party can have one of the option to answer the video call, make it a audio call only, or to discard the call. When the called party selects to answer the call, if they have DVR capability the STB can pause, record or mute the TV show or other presentation being watched. It is further noted that the concepts of the video call can be further extended to allow a subscriber to make a video call from the STB 504 to other mobile devices using a wireless carrier.

Other suitable modifications can be applied to the present disclosure without departing from the scope of the claims below. Accordingly, the reader is directed to the claims section for a fuller understanding of the breadth and scope of the present disclosure.

Figure 7:
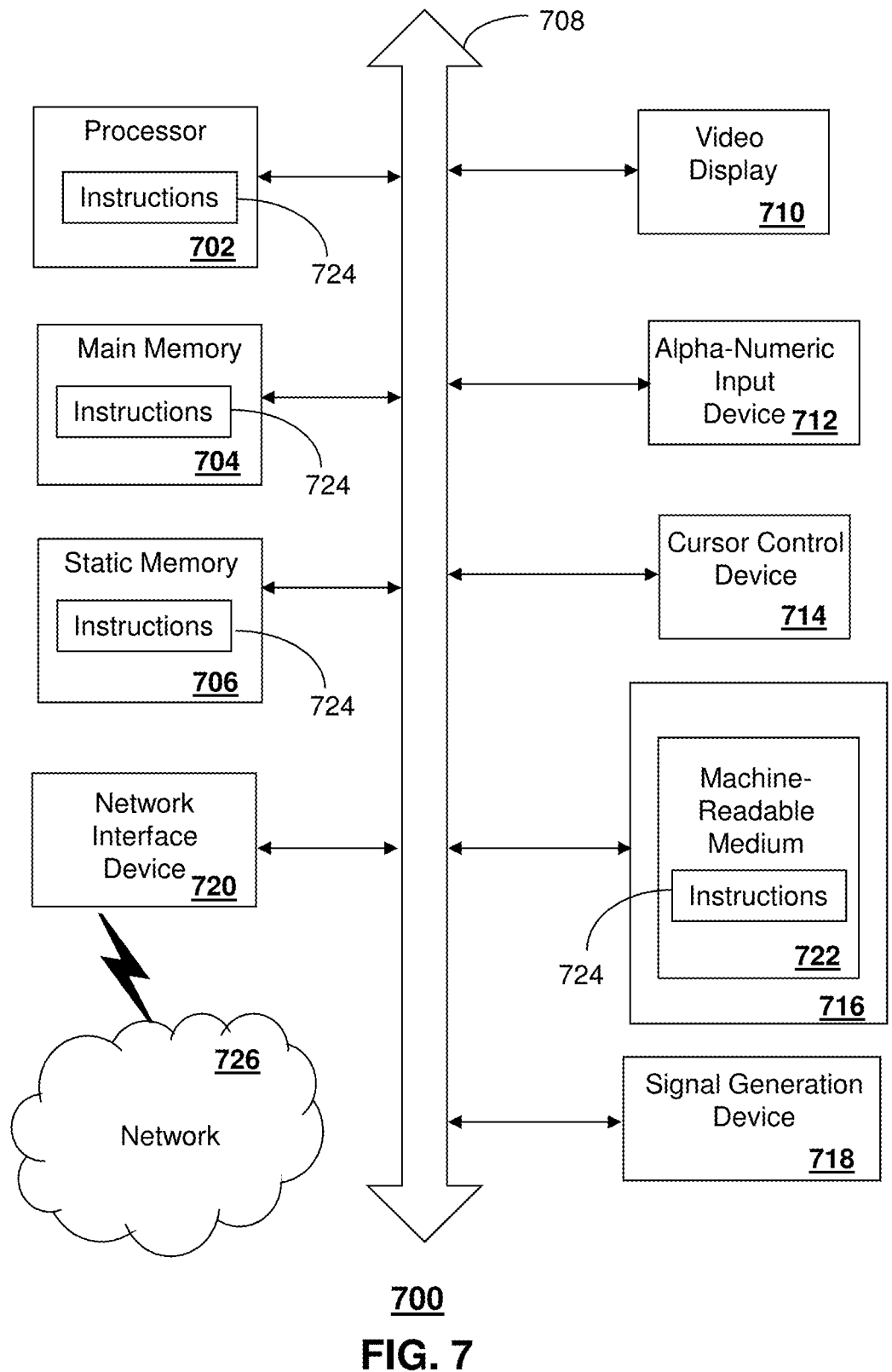
FIG. 7 is a diagrammatic representation of a machine in the form of a computer system within which a set of instructions, when executed, may cause the machine to perform any one or more of the methodologies discussed herein.

FIG. 7 depicts an exemplary diagrammatic representation of a machine in the form of a computer system 700 within which a set of instructions, when executed, may cause the machine to perform any one or more of the methodologies discussed above. The machine can operate, for example, as the STB or media controller 504, the gateway 104 or combinations thereof as described above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display (LCD), a flat panel, a solid state display, or a cathode ray tube (CRT)). The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; and magneto-optical or optical medium such as a disk or tape. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A media processor comprising:
    a processing system including a processor; and
    a memory that stores executable instructions that, when executed by the processing system, facilitates performance of operations comprising:
    initiating communications with a gateway device, wherein the gateway device selectively routes incoming calls to terminal devices including the media processor and a mobile cellular phone coupled to the gateway device via a femtocell;
    receiving a notice from the femtocell responsive to the mobile cellular phone initiating communications with the femtocell; and
    receiving incoming calls or initiating outgoing calls associated with a mobile cellular service used by the mobile cellular phone, responsive to the gateway device detecting that the mobile cellular phone has initiated communications with the femtocell and in accordance with routing instructions at the gateway device,
    wherein the femtocell provides a plurality of bundled wireless carrier services associated with a plurality of wireless telephone numbers, thereby increasing a number of available wireless telephone numbers for a plurality of mobile cellular phones to enable the receiving and initiating of calls at the media processor using any of the plurality of wireless telephone numbers.

2. The media processor of claim 1, wherein an incoming call comprises an incoming audio call or an incoming video call, and wherein an outgoing call comprises an outgoing audio call or an outgoing video call.

3. The media processor of claim 1, wherein an incoming call is routed by a switching element in the gateway device according to a destination address in a session initiation protocol message received by the gateway device.

4. The media processor of claim 3, wherein the operations further comprise providing the gateway device with routing preferences to direct calls to each of the terminal devices according to the destination address.

5. The media processor of claim 1, wherein the operations further comprise presenting a web portal enabling setting of routing preferences for the gateway device for routing an incoming call or for routing an outgoing call associated with the mobile cellular phone.

6. The media processor of claim 1, wherein the operations further comprise:
    selectively answering an incoming call routed to the media processor by the gateway device according to the routing instructions, wherein the incoming call is directed to the mobile cellular service;
    receiving the incoming call routed from the gateway device; and
    presenting the incoming call through a presentation device coupled to the media processor.

7. The media processor of claim 1, wherein the femtocell provides a plurality of phone numbers to enable the receiving and initiating of calls at the media processor using any of the plurality of phone numbers.

8. The media processor of claim 1, further comprising a digital video recorder, and wherein the operations further comprise causing the digital video recorder to pause, record or mute a media presentation responsive to answering an incoming call or initiating an outgoing call.

9. The media processor of claim 8 wherein, responsive to answering the incoming call, the media presentation is paused, recorded or muted based on an incoming caller identifier, wherein a caller identifier on a preferred mute list causes muting, a caller identifier on a preferred pause list causes a pause, and a caller identifier on a preferred record list causes recording of the media presentation.

10. A method comprising:
    facilitating, by a processing system including a processor, communications by a femtocell with a gateway device, wherein the gateway device selectively routes incoming calls to terminal devices including a media processor and a mobile cellular phone coupled to the gateway device via the femtocell;
    transmitting, by the processing system, a notice responsive to the mobile cellular phone facilitating communications with the femtocell;
    enabling, by the processing system, the mobile cellular phone to receive incoming calls or initiate outgoing calls associated with a mobile cellular service used by the mobile cellular phone, in accordance with routing instructions at the gateway device; and
    providing, by the processing system via the femtocell, a plurality of bundled wireless carrier services associated with a plurality of wireless telephone numbers, thereby increasing a number of available wireless telephone numbers for a plurality of mobile cellular phones to enable the receiving and initiating at the media processor using any of the plurality of wireless telephone numbers.

11. The method of claim 10, wherein the enabling is performed responsive to the gateway device detecting that the mobile cellular phone has established communications with the femtocell.

12. The method of claim 10, wherein an incoming call comprises an incoming audio call or an incoming video call, and wherein an outgoing call comprises an outgoing audio call or an outgoing video call.

13. The method of claim 10, wherein incoming calls or outgoing calls are routed in accordance with routing preferences supplied via a web portal presented by a soft-phone client executing on the media processor.

14. The method of claim 10, wherein the media processor selectively answers an incoming call routed to the media processor according to the routing instructions, wherein the incoming call is directed to the mobile cellular service, and wherein the media processor presents the incoming call through a presentation device coupled to the media processor.

15. The method of claim 10, wherein the gateway device receives a session initiation protocol message corresponding to an incoming call and comprising a called number, and wherein the incoming call is selectively routed according to the called number retrieved from the session initiation protocol message.

16. The method of claim 10, wherein the enabling is performed at a location having reduced cellular coverage.

17. A non-transitory machine-readable storage medium, comprising executable instructions that, when executed by a processing system including a processor, facilitate performance of operations comprising:
    initiating communications with a gateway device, wherein the gateway device selectively routes incoming calls to terminal devices and to a mobile cellular phone coupled to the gateway device via a femtocell;

receiving a notice from the femtocell responsive to the mobile cellular phone initiating communications with the femtocell; and receiving incoming calls or initiating outgoing calls associated with a mobile cellular service used by the mobile cellular phone, responsive to the gateway device detecting that the mobile cellular phone has initiated communications with the femtocell and in accordance with routing instructions at the gateway device, wherein the femtocell provides a plurality of bundled wireless carrier services associated with a plurality of wireless telephone numbers, thereby increasing a number of available wireless telephone numbers for a plurality of mobile cellular phones to enable the receiving and initiating of calls using any of the plurality of wireless telephone numbers.

18. The non-transitory machine-readable storage medium of claim 17, wherein an incoming call comprises an incoming audio call or an incoming video call, and wherein an outgoing call comprises an outgoing audio call or an outgoing video call.

19. The non-transitory machine-readable storage medium of claim 17, wherein an incoming call is routed by a switching element in the gateway device according to a destination address in a session initiation protocol message received by the gateway device.

20. The non-transitory machine-readable storage medium of claim 17, wherein incoming calls or outgoing calls are routed in accordance with routing preferences supplied via a web portal presented by a soft-phone client executing on a media processor.

* * * * *